United States Patent [19]
Schreiber

[11] Patent Number: 5,021,882
[45] Date of Patent: Jun. 4, 1991

[54] DEFINITION TELEVISION SYSTEMS

[75] Inventor: William F. Schreiber, Cambridge, Mass.

[73] Assignee: Massachusetts Institute of Technology, Cambridge, Mass.

[21] Appl. No.: 356,133

[22] Filed: May 24, 1989

[51] Int. Cl.⁵ .............................................. H04N 7/04
[52] U.S. Cl. ..................................... 358/141; 358/12; 358/133
[58] Field of Search ............... 358/11, 12, 13, 15, 358/133, 135, 138, 140, 141, 142, 143, 145, 146, 147

[56] References Cited

U.S. PATENT DOCUMENTS

| | | | |
|---|---|---|---|
| 4,268,854 | 5/1981 | Ozawa | 358/27 |
| 4,268,861 | 5/1981 | Schreiber et al. | 358/138 |
| 4,551,753 | 11/1985 | Nishizawa et al. | 358/140 |
| 4,551,754 | 11/1985 | Meise et al. | 358/180 |
| 4,621,286 | 11/1986 | Reitmeier et al. | 358/141 |
| 4,621,287 | 11/1986 | Reitmeier et al. | 358/141 |
| 4,628,344 | 12/1986 | Glenn | 358/12 |
| 4,707,728 | 11/1987 | Hurst | 358/12 |
| 4,721,998 | 1/1988 | Glenn | 358/37 |
| 4,785,348 | 11/1988 | Fonsalas et al. | 358/133 |
| 4,788,692 | 11/1988 | Takebayashi et al. | 358/135 |
| 4,855,811 | 8/1989 | Isnardi et al. | 358/12 |
| 4,907,087 | 3/1990 | Schreiber | 358/186 |

FOREIGN PATENT DOCUMENTS 208191 10/1985 Japan .
505653 5/1939 United Kingdom .
2138238 10/1984 United Kingdom .

OTHER PUBLICATIONS

"A Two Channel Picture Coding System: II-Adaptive Companding and Color Coding"; Schreiber et al.; IEEE Transactions on Communications, vol. COM-29, No. 12 Dec. 1981, pp. 1849-1858.
"A Proposal For a New High-Definition NTSC Broadcast Protocol"; by Iredale; The Del Ray Group; IEEE Transactions on Consumer Electronics; vol. CE-33, No. 1 Feb. 1987, pp. 14-27.
P. P. Vaidyanathan, "Quadrature Mirror Filter Banks, M-Band Extensions and Perfect-Reconstruction Techniques", IEEE ASSP Magazine, Jul., 1987, pp. 4-20.
E. A. Krause, "Motion Estimation for Frame-Rate Conversion", Advanced Television Research Program, 1987, pp. 1-180.
D. E. Troxel et al., "A Two-Channel Picture Coding System: I-Real-Time Implementation", IEEE Transactions on Communications, vol. Com-29, No. 12, Dec., 1981, pp. 1841-1848.
E. R. Kretzmer, "Reduced-Alphabet Representation of Television Signals", Bell Telephone Laboratories, Inc., pp. 140-147.
R. E. Crochiere et al., "Digital Coding of Speech in Sub-Bands", Manuscript, Mar., 1976, pp. 1069-1085.
P. J. Burt et al., "The Laplacian Pyramid as a Compact Image Code", IEEE Transactions on Communications, vol. Com-31, No. 4, Apr., 1983, pp. 532-540.
J. W. Woods et al., "Subband Coding of Images", IEEE Transactions on Acoustics, Speech, and Signal Processing, vol. ASSP-34, No. 5, Oct., 1986, pp. 1278-1288.

Primary Examiner—John W. Shepperd
Assistant Examiner—Michael D. Parker
Attorney, Agent, or Firm—Fish & Richardson

[57] ABSTRACT

A receiver-compatible EDTV system wherein enhancement information is adaptively modulated to suppress channel noise and is transmitted outside the usable picture area of a receiver compatible signal of the receiver compatible EDTV system.

5 Claims, 6 Drawing Sheets

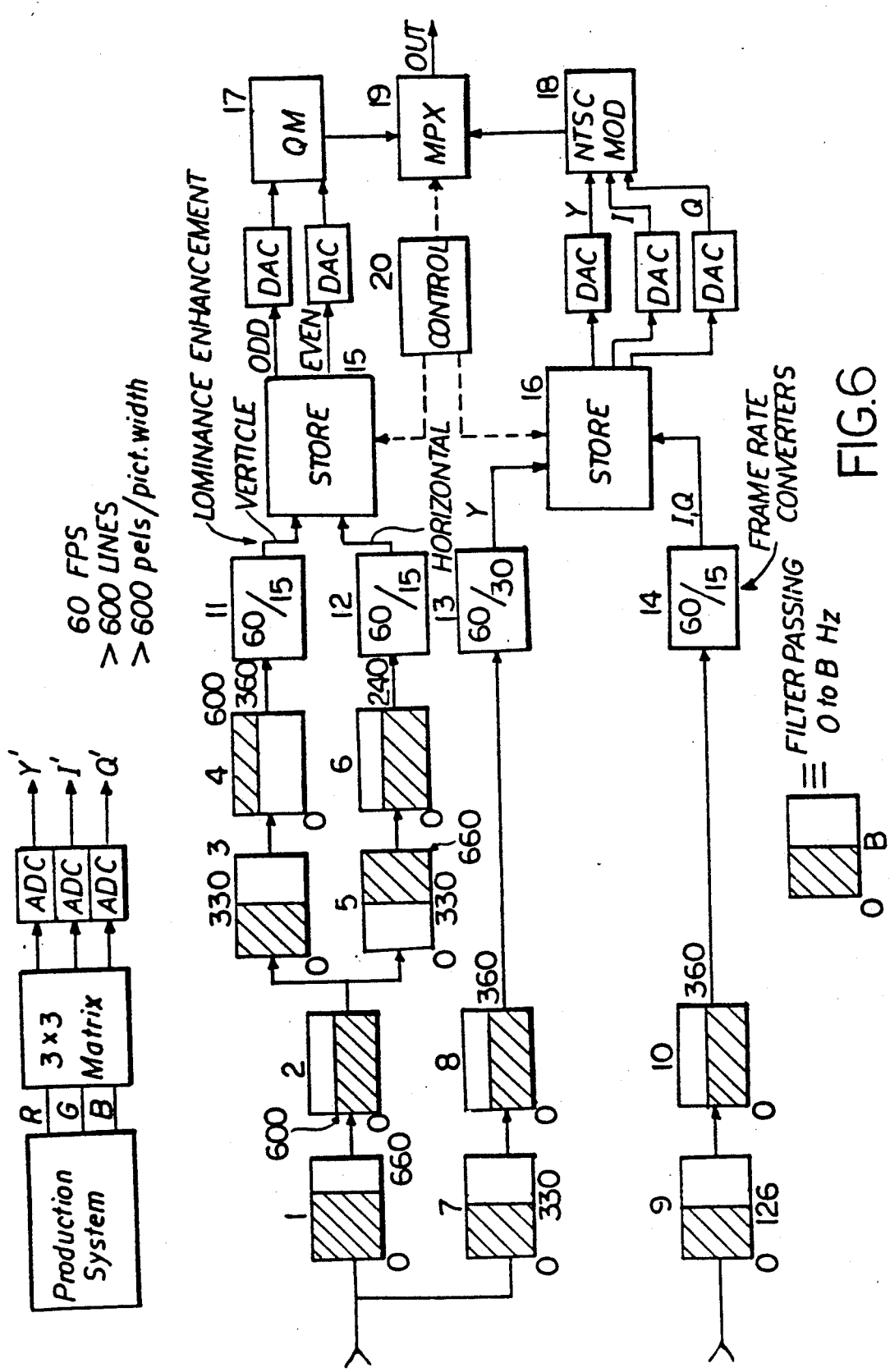

*Digital Signal*

*Analog Signal*

*Superimposed Signals*

DEFINITION TELEVISION SYSTEMS

This is a divisional of co-pending application Ser. No. 149,673 filed on Jan. 28, 1988.

BACKGROUND OF THE INVENTION

This invention relates to high-definition television (HDTV) systems.

Due largely to the development of the Japanese HDTV system, there is a great deal of interest in the design of systems that would feature better performance than the NTSC system now used in the U.S. Various systems have been proposed having improved spatial resolution, a wider aspect ratio, and free of NTSC defects due to interlace and to crosstalk between luminance and chrominance.

A very important feature of new systems is whether they are "receiver-compatible," which means that existing receivers would be able to decode and display the new transmissions. Another important feature is "channel compatibility," which means that the new signals could be transmitted properly in the 6-MHz channels now used for NTSC. Present broadcasters believe that receiver compatibility is necessary in order to continue serving the existing 140 million NTSC receivers. Unfortunately, the incorporation of the NTSC signal structure in new systems means that they will be inefficient in the transmission of information, and that it will therefore be impossible to achieve true HDTV performance with such receiver-compatible systems. One proposal is to start with an intermediate quality enhanced-definition (EDTV) system that is receiver-compatible and then move to a noncompatible system in a later stage. To employ this strategy the EDTV system must be a technological "bridge" to the final system, and preferably should be compatible with the new receivers to be used in the final system.

In the case of cable transmission, receiver compatibility is not required, since access is controlled anyway. The viewer must pay to see programs, and must have a new receiver to see them.

SUMMARY OF THE INVENTION

In general the invention features a receiver-compatible, enhanced-definition television (EDTV) system in which the enhancement information is added to the NTSC signal by usurping a fraction of the image height and providing the remaining area with the same aspect ratio as that of EDTV image. In preferred embodiments, the horizontal resolution of chrominance is doubled by subsampling a signal that has twice the normal resolution, so that every point of the higher resolution original is sampled once per two full frames; and missing points are filled in at the receiver by temporal interpolation.

In a further aspect, the invention features a receiver compatible, enhanced-definition television (EDTV) in which the enhancement signals are adaptively modulated to suppress channel noise.

When applied to NTSC incompatible systems, the invention is capable of achieving as high picture and sound quality as possible in an analog channel of a prescribed bandwidth, and in particular, within existing 6-MHz channels. Such NTSC incompatible embodiments are useful for cable transmission or as the second stage in going to HDTV in broadcasting, the first EDTV stage being receiver-compatible. The invention is capable of operating properly in real cable and broadcasting channels, deteriorating gracefully with less-than-perfect transmissions systems.

The invention embodies several important techniques:

Better utilization of the analog channel: The sound carrier, retrace intervals, and vestigial-sideband transmission of NTSC are replaced by double-sideband quadrature modulation of two 3-MHz baseband signals on a carrier in the center of the band. This increases by about 80% the number of perceived picture elements (pels) per frame. The various components are time-multiplexed, preferably reserving about 1/12 of the total channel capacity for data and high-quality audio (preferably digital). Double sideband quadrature modulation is meant to include not only classical quadrature modulation of a carrier by two amplitude modulated signals but also all equivalent modulation schemes, e.g., combined phase and amplitude modulation. The term is also not meant to limit in any way the particular implementation, and thus, for example, includes not only actual modulation of a carrier followed by bandlimiting but also direct synthesis of the bandlimited transmitted signal from a library of stored waveforms.

Use of frame store with separate scanning standards for camera, channel, and display: This permits very high vertical resolution (a high Kell factor) and eliminates interline flicker. It also permits utilizing the retrace intervals for information transmission, and increases the number of pels/frame about 40%.

Relatively less diagonal resolution: Use of a diamond-shaped frequency response takes advantage of the fact that the sensitivity of the eye to diagonal detail is less than that to vertical and horizontal detail. This contrasts with NTSC, in which the diagonal resolution is actually higher.

Relatively lower frame rate for higher spatial frequencies: This technique, which results in some blurring of moving objects (and which, by itself, has been used in other HDTV systems) gives a better tradeoff with respect to overall image quality. This principle, along with the previous one regarding diagonal resolution, indicates that the overall spatiotemporal frequency response used to select transmitted components should be diamond shaped in all directions (FIG. 5). (Note that when signals are transformed into the frequency domain, the normal representation involves both negative and positive frequencies. In the three dimensional case, therefore, there are eight octants in three-dimensional frequency space to be considered. To simplify the discussion and the diagrams, only the one octant with all positive frequencies is shown herein (e.g., FIG. 5). When we speak of "diamond" shapes, however, we are referring to the symmetrical shapes encountered when all eight octants are used. Only ¼ of the "diamond" appears in the region having positive frequencies.)

Relatively lower frame rate for chrominance: The temporal response of the visual system is lower for chrominance than for luminance, so an overall saving is possible by using different frame rates for the two kinds of signals. A lower spatial resolution for chrominance, both vertically and horizontally, is also used. NTSC uses only a lower horizontal resolution.

The use of all of the techniques mentioned so far is capable of increasing the perceived number of pels per frame about six-fold over that of NTSC. Additional techniques for achieving even greater improvement in image quality are:

Scene-adaptive variable frame rate: Any particular frame rate represents a tradeoff between spatial and temporal resolution. The best tradeoff depends on the amount of motion. We therefore use different frame rates, and achieve different spatial resolution, according to the degree of motion. We also use, on average, lower frame rates than now used in TV, giving weight to spatial and temporal resolution more nearly as done in motion picture practice. This is possible because the frame store permits an arbitrarily high display frame rate, eliminating large area flicker.

Mixed-highs color represention: NTSC uses a wide-band luminance and narrow band chrominance. A better alternative for our purposes is "mixed highs," which means narrow band red, green, and blue signals (RGB) plus a luminance high frequency component. The filtering used is two- or three-dimensional (horizontal, vertical, and temporal) rather than one-dimensional as in NTSC. This does not save channel capacity directly, but it facilitates using different frame rates for the different components, as well as noise reduction.

Improvement in signal to noise ratio (SNR): Noise or "snow" seriously deteriorates picture quality. The mixed highs system permits adaptive modulation of all of the signal components that have no dc-component, as disclosed in our copending application (herein incorporated by reference) Ser. No. 61,140, filed June 6, 1987, now issued as U.S. Pat. No. 4,907,087. The general idea is to raise the level of the highs components, which are typically very small, especially in the blank areas of the image where noise is most evident. The signals are multiplied by a factor, greater than one, as large as possible without channel overload. At the receiver, the components are divided by the same factor, at the same time greatly decreasing channel noise. Factors are assigned to blocks in spatiotemporal signal space and the actual factor used at any pel is chosen by interpolation, both in the transmitter and receiver. The block factors are transmitted to the receivers along with other control data.

Lower SNR for highs than for lows: This psychophysical phenomenon can be utilized to advantage by inserting an extra signal into each highs component. The extra data can be used to increase resolution, to improve the operation of the noise reduction process by using separate adaptation factors for each component, or for any other purpose. The general idea is to reduce the amplitude of the highs component and superimpose it on a multi-level digital signal, as illustrated in FIGS. 8A–8C. As long as the highs component summed with the expected noise does not exceed the separation between levels, the two signals can be separated perfectly at the receiver. Naturally, this reduces the arithmetic SNR by a factor equal to the number of levels.

Use of a "smart" receiver: A TV receiver capable of decoding transmissions making use of all of the principles mentioned must have a fair amount of computational power. Using modern components and techniques, such a receiver appears to be quite practical. By arranging the receiver so that the computation section that actually accepts the various signal components and arranges them properly has the bus-structured architecture of a computer, substantial economies are possible. This will be especially true because of the very large volume in which TV receivers are typically manufactured. This structure also makes it possible to design the receiver in such a way that it can readily decode and display NTSC, EDTV, and HDTV, the latter two in a variety of formats. In this connection, it is highly desirable that all of the programmability be located in the computation section, while the other sections, which involve analog components, be fixed. Of course, the analog "front end" must be tunable. The processor can be controlled by a small amount of digital data transmitted along with the signal. It can also be controlled or even modified by adding hardware or software modules that plug into one of the buses.

If the several signal formats to be decoded involve different analog modulation methods, certain adjustments are required in the "front end," which preceds the computation section in the signal path. Therefore, it is not sufficient to include a command code in the signal to indicate what kind of signal it is. The receiver must be able to recognize each of the various modulation methods without instruction so that the demodulator may be suitably configured. To achieve this result, the receiver, when first tuned to a signal, may be caused to initiate a search routine in which the several demodulator configurations are employed in sequence. The processor section can then analyze the demodulated signal to determine which type of modulation is in use. Obviously only previously agreed-upon modulation methods may be detected in this manner. It is, of course, possible to increase the repertory of allowable modulation methods by adding some plug-in units, provision for which can be made in the original design.

If there are more than a few types of modulation to be encountered, it will be found more efficient to have only the tuner in the "front end," and to perform the demodulation digitally in the digital processing section.

For cable use, it is necessary to encrypt the signal to prevent unauthorized viewing. Of course, authorized viewers must gain access to the proper programs, such access preferably being provided by addressing each receiver individually through the transmission system. In the system described, the signal is inherently encrypted, so every receiver requires a decoding key. Each receiver can be assigned an address, much like a telephone number. This address can be transmitted at the beginning of the program, or periodically, and recognized by the processor. Following the address, a code word can be sent, utilized only after the correct address, that sets up the processor to operate properly.

Motion compensation: For a given frame rate, it is possible to achieve much smoother rendition by interpolating intermediate frames making use of knowledge of the motion of each image point from frame to frame. E. A. Krause, "Motion Estimation for Frame-Rate Conversion," Ph.D. Thesis, MIT EECS Dept., June 1987. This motion may be detected at the encoder and transmitted along with the signal, or it may be detected entirely at the receiver. The smart receiver is designed in such a way that motion compensation may be accomodated by adding additional circuit boards, interfaced with one of the digital buses, to modify the action of the receiver in accordance with control information transmitted along with the signal.

In the preferred system, the TV camera, or, more generally, the TV production system, operates at high line and frame rates, preferably using progressive scanning. The resulting signal is divided into a number of components by three-dimensional filters, i.e., by filters operating in three-dimensional spatiotemporal frequency space. Preferably the components consist of rectangular blocks in this space, so that the three-dimensional filters are separable, meaning that they can be implemented as a cascade of one-dimensional filters, which are less expensive than nonseparable filters. The channel capacity required to transmit such a component is proportional to the volume of the corresponding block in three-dimensional frequency space, and preferably all blocks are of equal volume so as to simplify multiplexing. As many blocks are chosen for transmission as can be accomodated in the channel bandwidth, and the particular blocks chosen are those that will produce the highest subjective quality for the given subject matter. This means that the assemblage of blocks that are utilized form a blockwise approximation to the desirable diamond-shaped response.

In practice, perfectly rectangular blocks, which imply ideal filter characteristics, cannot be achieved. The filters must overlap somewhat and have less-than infinite slope cutoff shapes. Because of this the actual bandwidth required for transmission would ordinarily be larger than indicated using standard types of filters. Quadrature-mirror filters, as described in P. P. Vaidyanathan, "Quadrature Mirror Filter Banks, M-Band Extensions and Perfect-Reconstruction Techniques," IEEE ASSP Magazine (July 1987), are specifically intended for this application.

In the case of the blocks containing no dc-component, but only high-frequency information, it is within the scope of the invention to perform a nonlinear compression of each signal before transmission and an inverse nonlinear expansion at the receiver. As disclosed in W. F. Schreiber and R. R. Buckley, "A Two-Channel Picture Coding System: II-Adaptive Companding and Color Coding," IEEE Trans. on Communications, COM-29, 12, pp. 1849–1858 (December 81) such transformation can improve the perceived SNR by means of controlling the relative noise level in blank and busy image areas.

To transmit the chosen blocks, the video signals from the various blocks are time-multiplexed into one of the two baseband signals, and the latter are then quadrature modulated onto the carrier. Multiplexing can be done in many ways. In order to keep the temporal relationship among the various signals as close as possible to what prevailed in the input signal, thus minimizing the total amount of buffering needed, one scan line from each block is transmitted in sequence before a second scan line is used. Audio and miscellaneous data is multiplexed along with the block information.

Errors in quadrature demodulation cause the two baseband signals to be contaminated with each other. To make the result as insensitive as possible to imperfections in the process, the two baseband signals are made as similar as possible. In this case, they are derived from adjacent scan lines, so that crosstalk results only in some loss of vertical resolution.

At the receiver, the received signal is decoded and buffered (e.g., stored in a frame store). The various components are taken out of the buffer, interpolated, and assembled in correct geometrical arrangement, into a second buffer. Account is taken of the frame rate of each signal, any adaptive modulation that may have been used, whether it is luminance or chrominance, and what its frequency range is. Data is read out of the second buffer, interpolated, and used to drive the display device, which operates at a higher line and frame rate. Since the display is not programmable, all kinds of input signals result in the same line and frame rate on the display for any one receiver, but all receivers need not have the same display standards. Note that the particular arrangement of the display section depends on the cost of components. If memory were much cheaper than logic chips, then a large RGB buffer that maps 1:1 to the CRT image would be best; at today's prices, it would be better to keep the data in the buffer in a slightly compressed luminance/chrominance form and to use some interpolation and other signal processing between the buffer and the display; in the future, if memory becomes cheaper, this may change.

Since the resolution of this system is so high compared with NTSC, it can be used to transmit two or more independent signals simply by dividing the image area into sections. Of course, the receiver must "know" what arrangement is used so that proper decoding is done, and this is indicated by a code word in the data channel.

In cases where it is desired to obtain an exact diamond-shaped response in the spatial frequency plane, but at the same time use only separable filters, advantage can be taken of the fact that, in this system, transmission through the channel is effectively from the transmitter frame store to the receiver frame store. The order of transmission of the data within each frame is immaterial. If the frame is sampled diagonally, rather than in the normal horizontal raster, then two one-dimensional filters can achieve that desired diamond shape.

The invention also has application to receiver-compatible systems. In such systems, unmodified existing receivers will display a satisfactory picture, while new receivers, identical to that discussed above for the noncompatible version, will display an improved picture, and possibly improved audio. The studio and transmission equipment, of course, must be capable of high-definition performance. The required signal processing is actually somewhat more complicated than in the noncompatible scheme.

A number of proposals have been made for enhancing the quality of NTSC by adding extra signals to the NTSC format. It is believed that any additional signals must result in some deterioration of the performance of standard receivers. In this scheme, the NTSC signal format is unchanged, but a portion of the height of the image is usurped for enhancement information. Since proposed HDTV systems all have a wider aspect ratio, this usurpation can be done in such a way that the remaining area has the identical aspect ratio to the HDTV image that will be displayed on the special receivers. In the usurped area, a signal format for the enhancement information is used like that for the noncompatible system. Since the smart receiver can also decode NTSC, the compatible system can be thought of as using the HDTV format for a fraction of each frame and the NTSC format for the balance. The standard receiver displays only the NTSC portion, showing bars for the usurped area, while the smart receiver combines all the information to produce an enhanced wide aspect ratio image. The limited bandwidth available for enhancement information makes it preferable to forego scene adaptive variable frame rate and motion compensation in receiver-compatible systems.

Other features and advantages of the invention will be apparent from the following description of preferred embodiments of the invention, and from the claims.

DESCRIPTION OF THE PREFERRED EMBODIMENTS

FIG. 6 is a block diagram of the preferred embodiment of a receiver-compatible embodiment of the invention.

Figure 1:
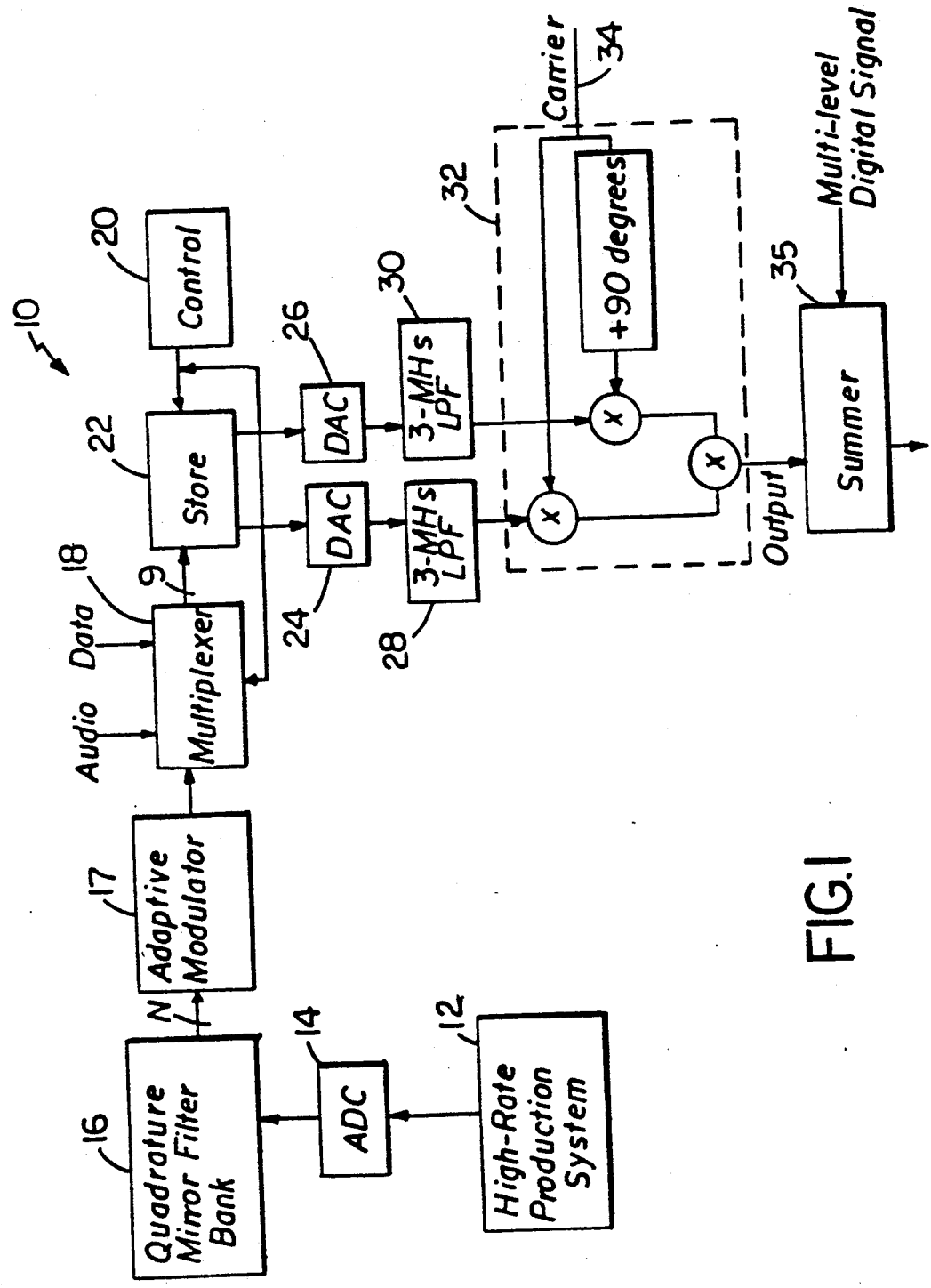
FIG. 1 is a diagram of the preferred embodiment of an encoder according to the invention.

A diagram of the preferred embodiment of an NTSC-incompatible encoder according to the invention is shown in FIG. 1. Encoder 10 includes high-rate production system 12 for producing a production signal to be processed and transmitted to a television receiver, analog to-digital converter 14, quadrature mirror filter bank 16 for dividing the production signal into fourteen components (nine of which are used at any one time), adaptive modulator 17 for adaptively compressing some of the high-frequency components, multiplexer 18 for selecting nine of the fourteen components (based on commands from control circuit 20), storage element 22 for storing the selected components and producing two streams of data, control circuit 20 for controlling multiplexer 18 and storage element 22, digital-to-analog converters 24 and 26, 3-megahertz low-pass filters 28 and 30, and quadrature modulator 32 for quadrature-modulating the two signals from storage element 22 onto carrier 34, which has a bandwidth of 6 megahertz. Encoder 10 may also include summer 35, for superimposing the analog signals onto a multilevel digital signal.

Figure 3:
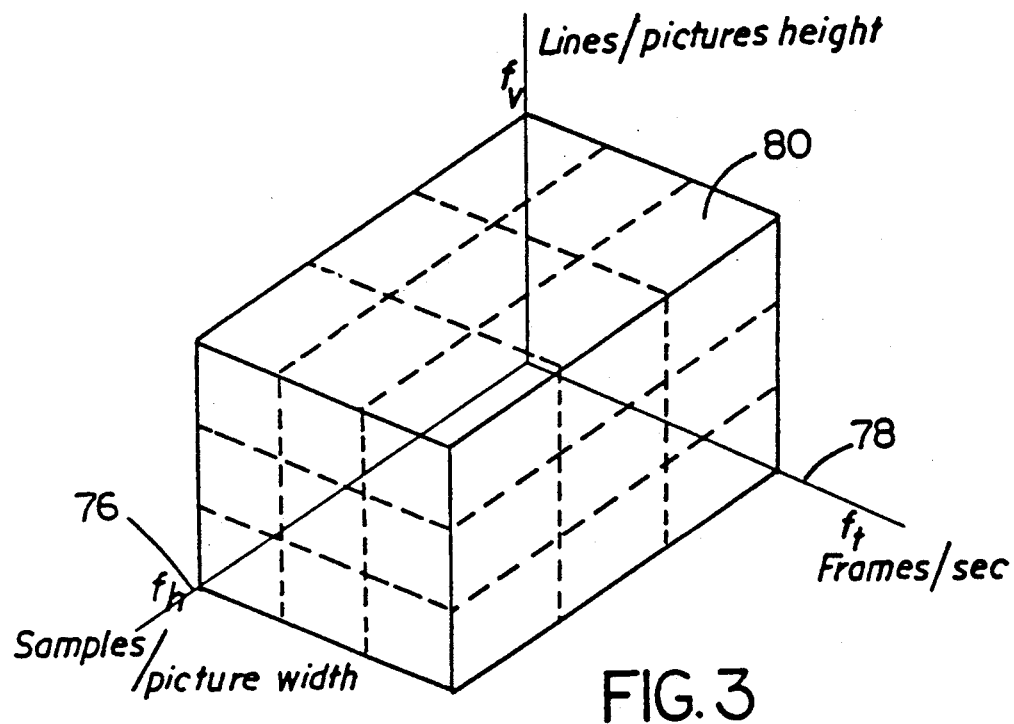
FIG. 3 is a diagram of three-dimensional spatio-temporal frequency space.
Figure 5:
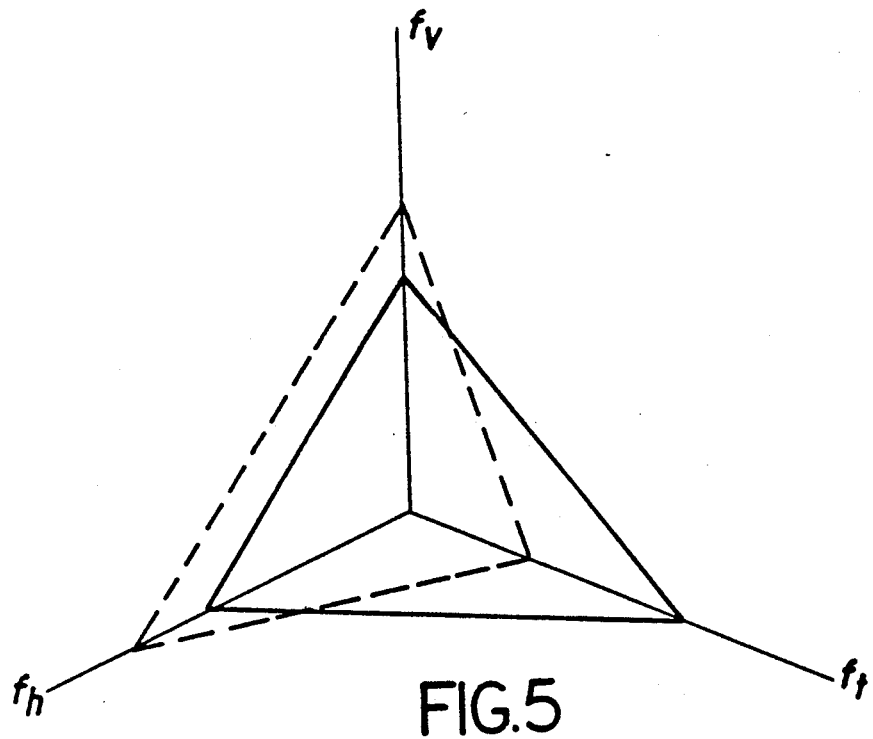
FIG. 5 shows two idealized, diamond-shaped frequency responses (the response shown in dashed lines giving more emphasis to spatial resolution than the one in solid lines).

The fourteen video components produced by filter bank 14 are best illustrated in three-dimensional spatio temporal frequency space. A diagram of three-dimensional frequency space is shown in FIG. 3. The spectrum of moving video signals may be displayed with respect to vertical and horizontal spatial frequency axes 74 and 76, respectively, and with respect to temporal frequency axis 78. The three-dimensional frequency space may be divided into blocks 80, corresponding to possible components of data contained in the moving video signals.

Figure 4A:
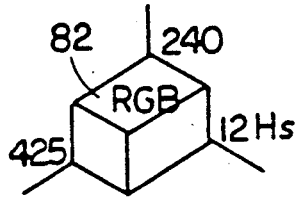
FIGS. 4A through 4F are diagrams of the possible selections of the components of the production signal, in three-dimensional spatiotemporal frequency space.
Figure 4B:
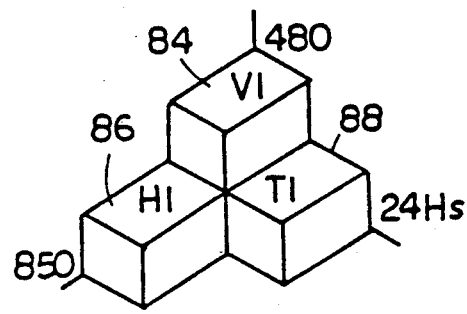
Figure 4C:
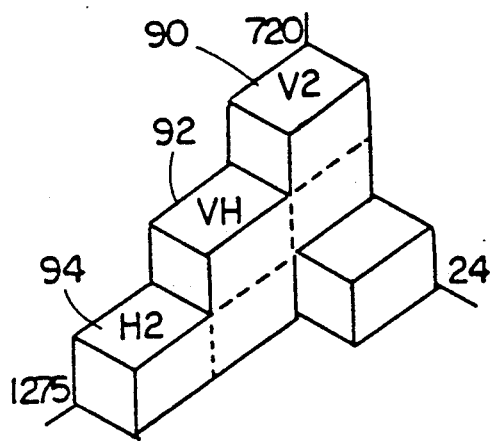
Figure 4D:
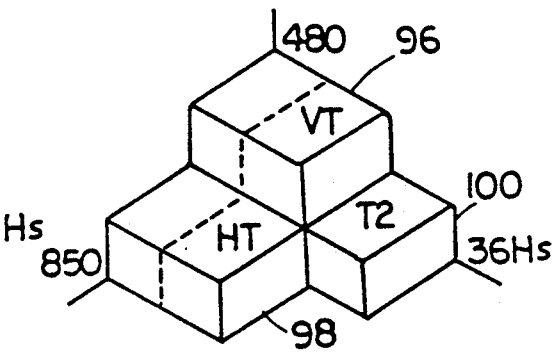
Figure 4E:
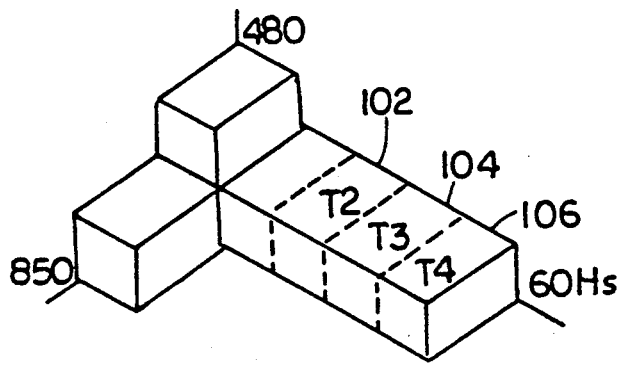
Figure 4F:
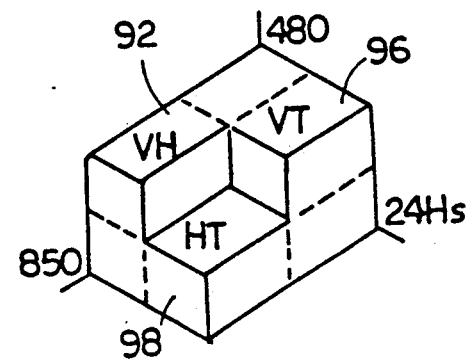
Figure 8A:
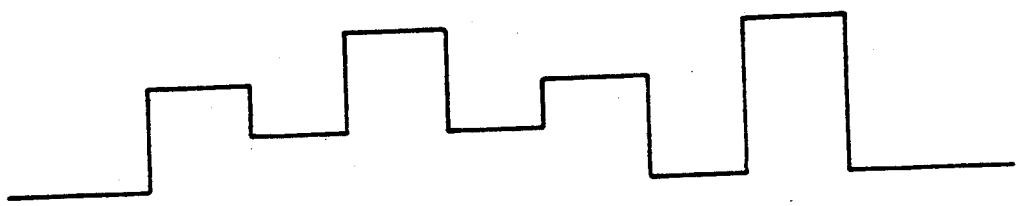
FIGS. 8A through 8C are diagrammatic illustrations of the process of superimposing an analog high-frequency image component on an additional digital signal.
Figure 8B:
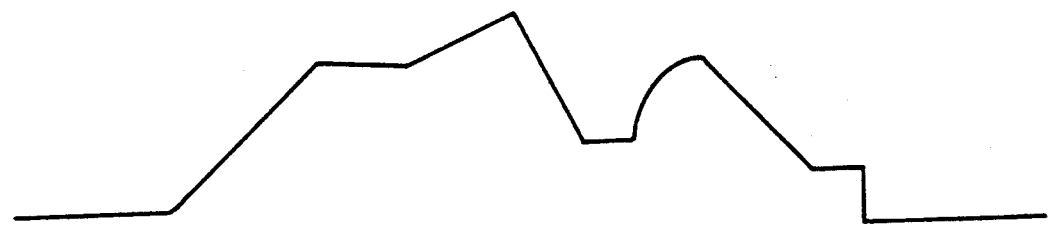
Figure 8C:
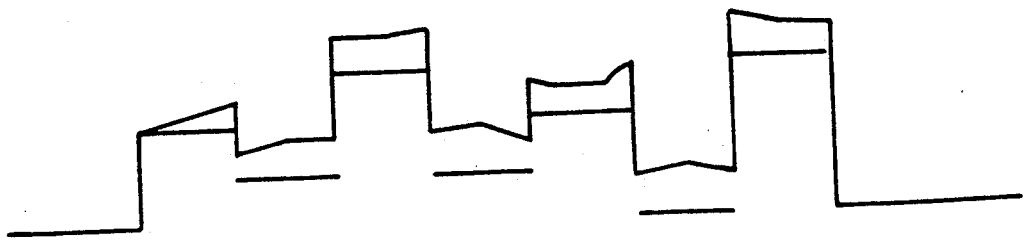

The possible selections of the components are illustrated in three-dimensional frequency space in FIGS. 4A through 4E. The three red, green, and blue chrominance "lows" signals represented by block 82 in FIG. 4A are always transmitted, as are the three luminance "highs" signals V1, H1, and T1, represented by blocks 84, 86, and 88, respectively, in FIG. 4B. In scenes with little motion, the three components V2, VH, and H2, represented by blocks 90, 92, and 94 in FIG. 4C are also transmitted. In scenes with medium degrees of motion, the three components VT, HT, and T2, represented by blocks 96, 98, and 100 in FIG. 4D are transmitted. In scenes with the fastest motion, the three components T2, T3, and T4, represented by blocks 102, 104, and 106 in FIG. 4E are transmitted. In the case of converting 24 fps film, low motion scenes use the blocks of FIG. 4C, while scenes with fast motion use the blocks of FIG. 4F. Thus, scenes with little motion are transmitted with more spatial resolution than scenes with substantial motion, which are transmitted with more temporal resolution.

Two or more images may be transmitted simultaneously along a single carrier, at the expense of lower spatial or temporal resolution for each image, or a reduction in size for each image. The horizontal, vertical, or temporal resolution of each of the various components of the production signal may be varied as desired to accomodate such a scheme. The total number of components associated with each image may also be varied as desired.

As shown in FIG. 1, multiplexer 18 multiplexes the nine components, along with digital audio information and data, into storage element 22. Information is read out of storage in two streams, corresponding to odd and even scan lines, on a line-sequential basis, under the control of control circuit 20. Each line is read successively from each component before the next line is read out. Digital-to analog converters 24 and 26 convert the two data streams into analog form. 3-Megahertz low-pass filters 28 and 30 filter the two data streams, and quadrature modulator 32 quadrature-modulates the two resultant 3-megahertz signals onto carrier signal 34, which has a bandwidth of 6 megahertz.

After 11 blocks of 9 lines each, one block (425 samples per line times 9 lines, or 3825 samples) of digital audio information and other data is transmitted. After 1/12 second, 120 scan lines from each component will have been transmitted in each data stream, for a combined total of 240 lines from each component. A very small amount of each line duration plus one or two lines per frame are devoted to synchronization signals.

In this arrangement, errors in quadrature demodulation due to carrier phase errors produce no effect other than a small loss in vertical resolution, since the two data streams in quadrature relate to successive lines in the picture. The effect of multipath transmission is minimized by using the slowest possible horizontal scan rate of the transmitted signal, which places any echoes as close as possible to the main signal. The signal design does not involve horizontal subsampling, which makes systems particularly vulnerable to multipath distortion.

Adaptive modulator 17, if used, improves the signal to noise ratio for the transmission system by adaptively modulating the luminance components, so as to raise the signal strength where the signal strength is low. Adaptive modulator 17 also produces adaptation information, which is multiplexed into the baseband signals, so that receiver 36 may adaptively demodulate the luminance components in response to the adaptation information.

Figure 2:
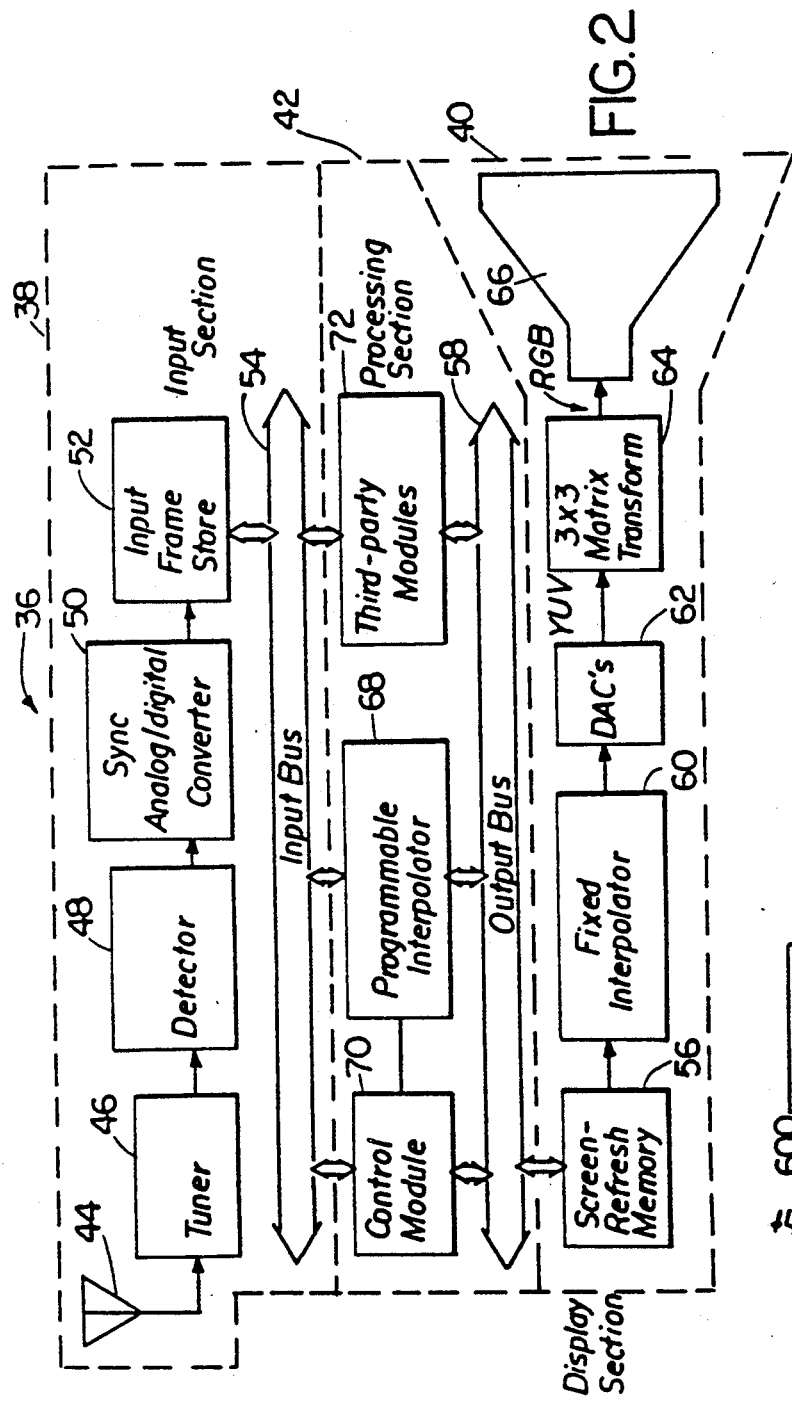
FIG. 2 is a diagram of the preferred embodiment of a receiver according to the invention.

A diagram of the preferred embodiment of a receiver according to the invention is shown in FIG. 2. Receiver 36 consists of input section 38, display section 40, and processing section 42.

Input section 38 includes antenna 44 for receiving signals, tuner 46 for selecting a channel, detector 48 for detecting the signals selected by tuner 46, analog-to-digital converter 50, and input frame store 52 for storing the digitized signals. Input frame store 52 interfaces with input bus 54. Alternatively, analog to-digital converter 50 may be placed before detector 48, so that detection may be done, digitally, in order to facilitate possible analog modulation schemes. Input section 38 is tunable, but not programmable. For a wide variety of input formats, it maintains in input frame store 52 a digital version of a complete "frame" as transmitted, but not in the form required for display.

Processing section 42 does the digital signal processing. Programmable interpolator 68 receives signals from input frame store 52 via input bus 54, rearranges and interpolates the signals for storage in screen refresh memory 56, and delivers the signals to output bus 58. Programmable interpolator 68 is supervised by control module 70, which receives programming data from input bus 54, and which interfaces with output bus 58. Third-party modules 72, which interface with input bus 54 and output bus 58, may provide signal enhancement, or may interface with digital signal sources, such as fiber-optic transmission lines.

Display section 40 is not programmable. Screen refresh memory 56 receives image data from programmable interpolator 68, and enhancement data and other data from third-party modules 72 and control module 70, via output bus 58. Screen-refresh memory 56 holds the image data in correct geometrical arrangement, at a standard frame and line rate, (not necessarily the frame and line rates transmitted or displayed) and in some slightly compressed form. The data is delivered to fixed interpolator 60, digital-to-analog converter 62, and 3-by-3 matrix transform 64, which process the analog signal for display on picture tube 66. All receivers 36 need not have the same display standard, but all kinds of signals received would be displayed at the same standard in any one receiver. A minimum would probably be 1200 lines, 60 frames per second progressively scanned, but higher would be better.

Programmable interpolator 68 or control module 70 may include a decoding key, such as a decoding card for decoding the transmitted signals, that can control access to the television transmission system. Alternatively, programmable interpolator 68 or control module 70 of each receiver might store a unique address, so that messages might be sent to individual receivers granting access to the television transmission system as previously arranged.

Programmable interpolator 68 in processing section 42 in display section 40 may provide improved temporal resolution by compensating for movement between successive frames. Thus, intermediate frames may be reconstructed, up to the maximum frame rate of which the display is capable.

If adaptive modulator 17 is used in encoder 10, then programmable interpolator 68 or control module 70 can receive the adaptation information produced by adaptive modulator 17 and transmitted along carrier 34, and adaptively demodulate the luminance components.

A description of a preferred, receiver-compatible system follows:

A high rate production system is used, preferably with at least 600 scan lines, 660 pels/line, and 60 fps, progressively scanned. The wideband RBG output signals are 3×3 matrix transformed to Y'I'Q', which are like the NTSC components except for the resolution and scanning standards. Y' is low-pass filtered to 360 lines vertical resolution and 330 pels horizontal resolution, and the highs are then formed as the difference between Y' and its filtered version. Y'I'Q' are low-pass filtered, subsampled, and filtered to form standard NTSC signals, which are then put into composite form in the normal manner and stored. The highs signal is separated into vertical and horizontal components by quadrature-mirror filters and stored. Optionally, the highs signal can be adaptively modulated for noise suppression or can be placed "over" a digital signal, which in this case would in all likelihood be digital audio. The two signals are taken out of storage and combined to produce the enhanced signal, with NTSC occupying the center 75% of the picture height (360 lines) and the enhancement information the remaining 25% (120 lines). The normal receiver sees NTSC for the most part, the enhancement information forming bars at top and bottom. Alternatively, the enhancement signal which is transmitted outside the usable picture area can be adaptively modulated for noise suppression and the effective bandwidth of the enhancement channel can be increased at the expense of signal-to-noise ratio by superimposing a reduced-amplitude enhancement signal on a multilevel digital signal.

A block diagram of the receiver-compatible system is shown in FIG. 6. The production system operates at least at 60 fps, progressively scanned, with resolution at least 600 high by 660 wide, with a 16:9 aspect ratio. The RGB signals are converted to Y'I'Q' in an analog matrix and digitized. The subsequent operations are filtering, frame-rate conversion, storage, retrieval, modulation, and multiplexing, under the guidance of the control circuitry 20.

All the filters shown are one-dimensional, with the passbands in crosshatch. Filters 1 and 2 confine the passband to 600 by 660. Filters 3 and 4 isolate the vertical enhancement data, and filters 5 and 6 isolate the horizontal enhancement data. Filters 7 and 8 limit the luminance bandwidth for the NTSC signal to 330 by 360, while filters 9 and 10 limit chrominance bandwidth to 126 by 360. Units 11-14 involve temporal filtering and subsampling. The NTSC luminance is reduced to 30 fps, interlaced, while luminance enhancement is reduced to 15 fps probably by 4th-order interlace. Chrominance is reduced to 15 fps by horizontal subsampling, so that it can be received compatibly on the NTSC receivers but expanded to the full 126 pels resolution by temporal interpolation (for the fixed areas) in the EDTV receiver. Spatial interpolation could be used for the moving areas in the EDTV receiver, as in MUSE. After frame-rate conversion, the chrominance information is stored.

Data is retrieved from the stores by the control unit in the time relationship required for the final signal, e.g., NTSC for the middle 360 lines and enhancement for the top and bottom 60 lines each. Luminance enhancement is separated into even and odd line information for the sake of the quadrature modulator 17. Information from store 16 feeds the NTSC modulator. The multiplexer, also supervised by control circuitry 20, selects the appropriate signal for output.

The smart receiver separates the various components and combines them to produce an EDTV picture.

Figure 7:
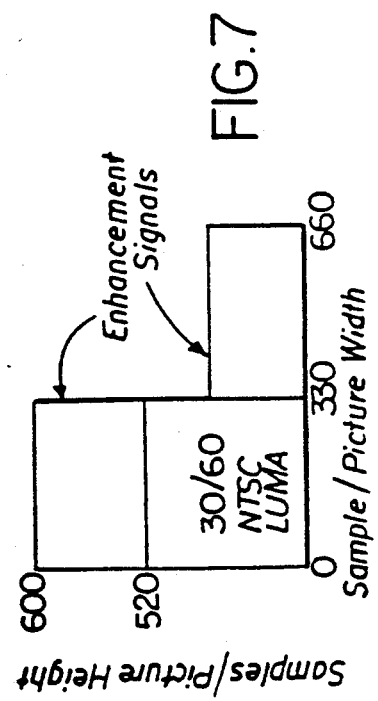
FIG. 7 is a daigram of spatial frequency space showing the transmitted components of the receiver compatible system.

The particular resolutions chosen for this embodiment are shown in FIG. 7. The NTSC luminance component is one-dimensional filtered to a horizontal resolution of 330 pels and it is 360 lines high. Since the sound carrier cannot be interrupted during the 120 lines used for enhancement, only 5.5 MHz of channel bandwidth is available. Using a carrier 1.5 MHz above the normal carrier, two baseband signals of 1.75 MHz can be used, for a total bandwidth of 5.5 MHz, or 11 million samples/sec. With about 60 microsec available on each line, 660 samples per sec are transmitted. We choose to form this 660×120 block (30/sec) into two 330×240 blocks, 15/sec. These blocks are used to increase the vertical resolution to (360+240=) 600 lines/picture height at 15 fps for the lowest 330 pels/picture width, and to increase the horizontal resolution to (330+330=) 660 pels/picture width for the lowest 330 lines/picture height.

In the event that the format of the enhancement signal causes some NTSC receivers to malfunction, several changes can be made that will make every receiver work perfectly, at the expense of some enhancement. By using only 60 microsec of each line (out of 62.4) we have already allowed space for a normal horizontal synch pulse. It is possible that the nonstandard carrier position (or, rather, the lack of carrier at the normal frequency) may cause trouble in some receivers using AFC. In that case we can use the normal carrier and vestigial sideband modulation of one component. This reduces the enhancement block to 252×240 from 330×240. Some of this may be recouped by using the Matsushita technique, in which an extra signal of perhaps 0.8 MHz quadrature modulates the main carrier. This makes the enhancement block about 300×240.

In NTSC, there is no specific limitation on vertical chrominance resolution, and in this embodiment we keep it at the full 360 lines. (Other methods, such as comb filtering and the Fukinuki technique, greatly reduce the vertical chrominance resolution.) The horizontal resolution of chrominance is very small in NTSC. In this case, the filtering discussed above, which completely eliminates chrominance/luminance crosstalk, limits horizontal resolution to 63 pels/picture width, which is rather small, especially in view of the fact that the luminance resolution has been raised to 660. Therefore we use a subsampling technique that has the effect of reducing the frame rate for chrominance detail to 15 fps. On each line in each frame, every other chrominance sample is chosen, in an offset pattern, from an original chrominance signal (separately for I and Q) which has 126 pels/picture width. Every sample is chosen at 15 fps. This technique, which is used in some proposed HDTV systems, produces unacceptable flicker on standard receivers when used for luminance, but because of the lower temporal resolution of the visual system for chrominance than for luminance, little flicker is seen in chrominance. On the standard receiver, pels in successive frames, although derived from adjacent points in the high resolution original, are deposited at the same point. In the smart receiver, temporal interpolation is used to fill in the missing samples in each frame. The net result is that the chrominance signals are 126×360, which is quite acceptable.

OTHER EMBODIMENTS

Other embodiments are within the following claims. For example, if both storage element 22 in encoder 10 and input frame store 52 in receiver 36 are addressed diagonally, and if the transmitted information passes through separable filters, then the spatial frequency response of the transmitted information will be diamond-shaped. It has been suggested that a diamond shaped spatial frequency response will produce better results.

What is claimed is:

1. A receiver-compatible EDTV system comprising means for adaptively modulating an enhancement signal so as to suppress channel noise and means for transmitting the adaptively-modulated enhancement signal as part of a receiver-compatible signal and outside the usable picture area of the receiver-compatible EDTV system but within at least a portion of the usable picture area of an NTSC system, said receiver-compatible signal carrying an EDTV aspect ratio image.

2. The system of claim 1 further comprising means for increasing effective bandwidth at the expense of signal-to-noise ratio by superimposing a reduced amplitude enhancement signal on a multilevel digital signal, said reduced-amplitude enhancement signal being derived from the adaptively-modulated enhancement signal.

3. The system of claim 1 further comprising a receiver compatible with said enhanced-definition television system, said receiver comprising compatible front-end circuitry for selecting and demodulating the received RF signal to produce a video signal, compatible processing circuitry for processing the video signal to produce display data, and display circuitry to display said data on a display device.

4. The system of claim 1 wherein the enhancement signal is placed within bar areas located at the top and/or bottom of the usable picture area of the NTSC system.

5. The system of claim 1 wherein said high frequency information lies outside a block of frequency space, said block having the dimensions of about 425 samples per width by 240 lines per height by 12 frames per second.

* * * * *

UNITED STATES PATENT AND TRADEMARK OFFICE
CERTIFICATE OF CORRECTION

PATENT NO. : 5,021,882

DATED : June 4, 1991

INVENTOR(S) : William F. Schreiber

It is certified that error appears in the above-identified patent and that said Letters Patent is hereby corrected as shown below:

Col. 12, line 19, after "signal" insert --of high frequency information--.

Signed and Sealed this

Twenty-fifth Day of May, 1993

Attest:

MICHAEL K. KIRK

Attesting Officer

Acting Commissioner of Patents and Trademarks